US006852852B2

(12) United States Patent
Klohr et al.

(10) Patent No.: US 6,852,852 B2
(45) Date of Patent: Feb. 8, 2005

(54) METHOD OF PRODUCING REGIOSELECTIVELY SUBSTITUTED ESTERS OF OLIGO- AND POLYSACCHARIDES

(75) Inventors: Erik-Andreas Klohr, Walsrode (DE); Wolfgang Koch, Bomlitz (DE); Dieter Klemm, Weimar (DE); René Dicke, Jena (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 10/272,898

(22) Filed: Oct. 17, 2002

(65) Prior Publication Data

US 2003/0162745 A1 Aug. 28, 2003

Related U.S. Application Data

(62) Division of application No. 09/516,174, filed on Feb. 29, 2000, now Pat. No. 6,489,468.

(30) Foreign Application Priority Data

Mar. 5, 1999 (DE) .......................................... 199 09 786
Oct. 27, 1999 (DE) .......................................... 199 51 734

(51) Int. Cl.⁷ .............................. C08B 3/06; C08B 3/00; C08B 31/02; C07H 1/00
(52) U.S. Cl. .............................. 536/69; 536/68; 536/58; 536/63; 536/107; 536/110; 536/115; 536/124
(58) Field of Search .............................. 536/69, 68, 58, 536/63, 107, 110, 115, 124

(56) References Cited

U.S. PATENT DOCUMENTS

| 4,038,482 A | * 7/1977 | Eastman ..................... 536/110 |
| 4,443,595 A | * 4/1984 | Namikoshi et al. ........... 536/58 |
| 4,614,718 A | 9/1986 | Seino et al. ................... 435/72 |
| 5,270,421 A | 12/1993 | Dordick et al. .............. 527/311 |
| 5,618,933 A | 4/1997 | Dordick et al. .............. 536/115 |
| 5,681,727 A | 10/1997 | Poulina et al. .............. 435/135 |
| 5,703,226 A | 12/1997 | Nickel et al. ............... 435/107 |
| 5,714,601 A | 2/1998 | Tanaka et al. .............. 536/107 |
| 5,733,750 A | 3/1998 | Lund et al. .................. 435/72 |
| 6,489,468 B1 | * 12/2002 | Klohr et al. ................ 536/107 |

FOREIGN PATENT DOCUMENTS

JP           63-191802         8/1988
WO           97/36000          10/1997

OTHER PUBLICATIONS

Mansson et al, "Homogeneous Acetylation of Cellulose Via the Nitrite Ester", Cellulose Chemistry and Technology, 14, 13–17 (1960).*
Biotechnol. Bioeng., vol. 30, (month unavailable) 1987, pp. 81–87, Lanne et al, Rules for Optimization of Biocatalysis in Organic Solvents.
FEMS Mircobiol. Rev., 16, (month unavailable) 1995, pp. 193–211, Joachim Thiem, Applications of enzymes in synthetic carbohydrate chemistry.
J. Prakt. Chem., 335, (month unavailable) 1993, pp. 109–127, Reidel et al, Enzymatic Protecting Group Techniques in Bioorganic Synthesis.
J. Am. Chem. Soc. (month unavailable) 1987, pp. 3977–3981, Therisod et al, Regioselective Acylation of Secondary Hydroxyl Groups in Sugars Catalyzed by Lipases in Organic Solvents.
Enzyme & Microb. Technology, 20, (month unavailable) 1997, pp. 225–228, MacManus et al Reversal regioselectivity in the enzymatic acylation of secondary hydroxyl groups mediated by organic solvents.
Biotechnol. Letters, vol. 19, No. 6, Jun. 1997, pp. 511–514, Shibatani et al, Enzymatic synthesis Of vinyl sugar ester in dimethylformamide.
Tetrahedron, 54 (month unavailable) 1998, pp. 3971–3982, Mozhaev et al, Regioselective Enzymatic Acylation as a Tool for Producing Solution–Phase Combinatorial Libraries.
Synthesis, (month unavailable) 1993, pp. 895–910, Faber et al, Enzyme–Catalyzed Irreversible Acyl Transfer.

* cited by examiner

*Primary Examiner*—James O. Wilson
*Assistant Examiner*—Everett White
(74) *Attorney, Agent, or Firm*—Joseph C. Gil; James R. Franks

(57) ABSTRACT

A method of producing a cellueose ether that is predominantly substituted in the C2 position of the anhydroglucose unit of the cellulose is described. The regioselectively substituted saccharide ester produced according to the method of the present invention is selected from the group consisting of oligo-saccharide ester and polysaccharide ester, having a partial average degree of substitution (AS) at the C2 position of its anhydroglucose unit of at least 90% relative to the total AS. Also described is a blood plasma expander comprising the regioselectively substituted ester.

13 Claims, No Drawings

METHOD OF PRODUCING REGIOSELECTIVELY SUBSTITUTED ESTERS OF OLIGO- AND POLYSACCHARIDES

CROSS REFERENCE TO RELATED PATENT APPLICATIONS

The present patent application claims the right of priority under 35 U.S. C. § 121 of U.S. patent application Ser. No. 09/516,174, filed Feb. 29, 2000, now U.S. Pat. No. 6,489,468 B1.

FIELD OF THE INVENTION

This invention relates to esters of oligo- and polysaccharides which are regioselectively substituted, predominantly at the C2 position of the anhydroglucose unit (AGU), and also relates to a method of producing them using enzymes and/or defined salts as catalysts for ester formation. Regioselectively substituted esters of this type have basic properties which are different from those of conventional, randomly functionalised products.

BACKGROUND OF THE INVENTION

It is known that when oligo- and polysaccharides are subjected to esterification by conventional methods, products are formed which exhibit a random distribution of the esters groups within the AGU and along the chain. This randomness depends on the accessibility to electrons or on the spatial accessibility of the individual hydroxyl groups. Thus in starch, for example, the hydroxyl group in the C6 position is a primary group which is very sterically accessible and which thus exhibits the highest accessibility during heterogeneous reactions in particular. The hydroxyl function of the C2 position forms the basis of the electronic effect of the adjacent glycoside bond and of the electron-attracting properties of the ring oxygen. In homogeneous processes, it has been shown that the C2 position reacts first for this reason. In none of the aforementioned situations, however, is the complete reaction of only one hydroxyl group achieved.

By utilising differences in accessibilities such as these, hydroxyl groups can be selectively blocked with the aid of protective groups, which are generally bulky and can easily be split off, so that regioselective derivatives are formed in subsequent reactions.

Examples of protective groups such as these include triphenylmethyl groups or bulky organosilicon entities such as t-hexyl- or tert-butyl-dimethylsilyl groups.

However, this type of synthesis has the decisive disadvantage that at least two additional reaction steps are necessary due to the introduction of the protective group and the separation thereof. Other disadvantages are the fact that the separation of the protective groups is sometimes incomplete, which means that the cleavage products which are formed thereby, and which are sometimes toxic, have to be removed without leaving a residue, as well as the breakdown of the polysaccharide chain which is possible under the conditions of cleavage and which changes the properties of the product.

When a plurality of reactive centres, e.g. hydroxyl groups, exists in a molecule, enzymes are capable of catalysing direct, selective esterification reactions. In this connection, each enzyme has a certain folded (native) structure which is essential for its specific biocatalytic activity in the physiological medium concerned. It has been shown in numerous publications, however, that many enzymes are also active in organic solvents, i.e. are active irrespective of their native structure, size and function. Enzymes generally exhibit a high activity in nonpolar solvents, whereas only very low activities are found in relatively polar media (Biotechnol. Bioeng. 30 (1987), 81–87). Enzymes are insoluble in the latter organic solvents.

Numerous enzyme-catalysed reactions of this type have already been carried out on low molecular weight mono- and disaccharides in organic solvents (FEMS Microbiol. Rev. 16 (1995), 193–211; J. Prakt. Chem. 335 (1993), 109–127; Synthesis 1992, 895–910; WO 97/36000; WO 95/23871). In these reactions lipases have primarily been used as the enzymes, although esterases and proteases have also been used, and solvents such as tetrahydrofuran, pyridine and N,N-dimethylformamide have been employed. Enzymatic esterification can also be effected in an aqueous buffer solution. One disadvantage here is that the acylating reagent, which has a character similar to that of a fatty acid, is insoluble in the aqueous buffer solution and can thus only be suspended therein. The substrate which is to be esterified is present in dissolved form (DE-A-34 30 944, 1992; JP-A-63191802).

Glucans generally result in the formation of esters at primary hydroxyl groups. In some cases, esterification also occurs at secondary hydroxyl groups (J. am. Chem. Soc. 109 (1987), 3977–3981; Enzyme Microb. Technol. 20 (1997), 225–228). Compounds which comprise electron-attracting groups are generally used for the aforementioned enzymatic esterifications, such as vinyl esters (Biotechnol. Lett. 19 (1997), 511–514) or trihalogenoethyl esters (Tetrahedron 54 (1998), 3971–3982); esterification by a vinyl ester constitutes an irreversible reaction, since the vinyl alcohol which is formed is removed as acetaldehyde from the reaction equilibrium. Other reactive compounds include carboxylic anhydrides and esters of carbonic acid.

Diesters of dicarboxylic acids have also been used for reaction with mono- and disaccharides. In this manner, it has proved possible to synthesise new saccharide-based copolymers, as disclosed in U.S. Pat. No. 5,270,421 and U.S. Pat. No. 5,618,933.

In the publications described above, the substrate and the acylating reagent are generally dissolved in an organic solvent, in which the enzyme is then suspended. Enzymatic esterifications cannot be effected on polysaccharides, particularly glucans, by the methods cited above, since the undissolved or unswollen polymer is not accessible to the enzyme or to enzyme catalysis. Polysaccharides can be esterified enzymatically in a heterogeneous phase, however (WO 96/13632, DE-A-34 30 944). These heterogeneous reactions only proceed at the surface of the polymer particles, due to which inhomogeneously esterifed polysaccharide derivatives are formed, i.e. polysaccharide derivatives which comprise a non-uniform distribution of substituents along the polymer chain. Other disadvantages of this method of esterification are that low yields of product are obtained and products are formed which comprise a low degree of selectivity as regards the type of substitution in the anhydroglucose unit.

Conventional heterogeneous esterifications are often conducted in water as a suspension medium (U.S. Pat. No. 5,703,226, 1997). Homogeneous reactions are conducted in organic solvents or in the acylating reagent directly (U.S. Pat. No. 5,714,601, 1998; WO 96/14342). The corresponding carboxylic anhydrides or vinyl esters are generally used as acylating agents. Esterifications or transesterifications of this type are mostly catalysed by alkalies, wherein suitable catalysts include alkali hydroxides, salts of mineral acids or organic amines.

SUMMARY OF THE INVENTION

The object of the present invention was to enable esters of oligo- and polysaccharides to be obtained which are homogeneously and regioselectively substituted at the C2 position of the anhydroglucose unit (AGU). Success has now been achieved according to the invention in producing esters of oligo- and polysaccharides which are homogeneously and regioselectively substituted at the C2 position of the AGU. The present invention therefore relates to oligo- and polysaccharide esters which are esterified regioselectively, with ester groups at the C2 position of the AGU preferably amounting to at least 90%, most preferably 90 to 98%, of the total degree of substitution (partial average degree of substitution AS at the C2 position of the AGU with respect to the total AS). The oligo- and polysaccharide esters which are regioselectively substituted at the C2 position and which are particularly preferred according to the invention are esters of starch or starch derivatives, particularly hydroxyethylstarch or hydroxypropylstarch. The present invention also relates to esters, which are regioselectively substituted at the C2 position, of cellulose, cellulose esters or cellulose ethers, particularly of hydroxyethyl cellulose, methyl cellulose, pullulan or maltose. The oligo- and polysaccharide esters according to the invention are obtainable by reaction with esterification reagents from the group comprising vinyl esters, carboxylic anhydrides and trihalogenoethyl esters, as well as lactones, which are described in more detail below in the description of the method. Oligo- and polysaccharide esters which regioselectively substituted at the C2 position and which are particularly preferred according to the invention are 2-O-propionylstarch, 2-O-butyrylstarch, 2-O-benzoylstarch, 2-O-laurylstarch, 2-O-methoxycarbonylstarch, 2-O-acryloylstarch and 2-O-methacryloylstarch, most preferably 2-O-acetylstarch. According to the invention, the oligo- and polysaccharides which are regioselectively substituted at the C2 position can be esterified at the remaining OH groups of the AGU with other ester groups which are not identical to the ester groups at the C2 position.

The present invention further relates to a method of producing the compounds according to the invention in the presence of an organic solvent, which method is catalysed by enzyme or salt and is carried out on a dissolved or highly swollen oligo- or polysaccharide.

DETAILED DESCRIPTION OF THE INVENTION

Starting from the disadvantages of the known methods which were described above, e.g. low yields of product and low degrees of regioselectivity, it has thus proved possible, using catalysis by means of enzymes, to effect the esterification of oligo- and polysaccharides, which are dissolved in organic solvents or which are strongly swollen, regioselectively at the secondary hydroxyl group of the C2 position, and has also proved possible to effect said esterification in combination with the esterification of the primary hydroxyl group of the C6 position of the AGU. The method results in very high product yields, and the partial degrees of substitution can be varied and adjusted over wide limits. Particularly high regioselectivities are achieved with oligo- and polysaccharides which comprise an α-(1,4)-glycoside linkage, particularly starch. However, the method can also be applied to oligo- and polysaccharides which comprise a β-(1,4)-glycoside linkage. Organic solvents which are suitable in principle are those in which the oligo- and polysaccharides which are used exhibit considerable swelling or dissolve, and in which the enzymes used exhibit satisfactory activity. Polar organic solvents such as Dimethyl sulphoxide (DMSO), N,N-dimethylformamide (DMF), N,N-dimethylacetamide (DMA), pyridine and N-methylmorpholine-N-oxide (NMMO) can therefore be used as solvents, as can mixtures of the aforementioned solvents. DMSO is preferred. The enzymes surprisingly exhibit high activity, particularly in DMSO, and products which are esterified strictly regioselectively are obtained in a single-stage reaction. These esters can be converted into regioselectively substituted mixed derivatives, such as esters and ethers, by subsequent, selective reactions.

The esterification can be carried out on polysaccharides, preferably on starch from various natural sources and with wide range of amylose contents and molecular weights, and on starch derivatives, particularly hydroxyethylstarches or hydroxypropylstarches, and can also be carried out on cellulose, cellulose derivatives, pullulan, pullulan derivatives and oligosaccharides.

Proteases of all types can be used as enzymes. The preferred proteases are serine-, cysteine-, asparagine- and metalloproteases. The proteases are preferably dissolved in a phosphate buffer, or alternatively in a carbonate buffer, within a pH range of 4–9 depending on the enzyme, preferably at pH 7–8, and are subsequently lyophilised. The preferred proteases are proteinase N and subtilisin of *Bacillus subtilis*, proteinase 2A of *Aspergillus oryzae*, proteinase 6 of *Aspergillus* sp., a-chymotrypsin, papain, renin and thermolysin.

Esters of general formula

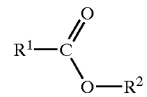

are preferably used as esterification reagents, wherein $R^2$ preferably denotes a saturated or unsaturated alkyl group comprising 2 to 6 C atoms, or an unsaturated or saturated, branched or unbranched trihalogenoalkane radical comprising 2 to 4 C atoms, particularly vinyl, trihalogenoethyl or alkyl. $R^1$ is preferably an alkyl group comprising 2–18 C atoms, which can be saturated, unsaturated, straight-chain, branched or cyclic and which can optionally be substituted, or an aryl group (which is optionally substituted). $R^1$ is most preferably selected from the group comprising acetyl, propyl, butyryl, vinyl, methacryl, cinnamoyl, pivaloyl and cyclohexyl. When esters of alkenoic acids are used, the double bonds can also be utilised for polymerisation in order to build up network structures. This option also exists when using esters of dicarboxylic acids comprising the $R^2$ radical, such as vinyl adipate, wherein crosslinking can be effected uniformly in the special polysaccharide.

Esterification reagents which are particularly suitable include vinyl acetate, vinyl propionate, vinyl laurate, vinyl butanoate, vinyl stearate, vinyl benzoate, vinyl acrylate, vinyl methacrylate, vinyl crotonate, vinyl pivalate and divinyl pivalate.

Other esterification reagents include carboxylic anhydrides, preferably acetic anhydride, propionic anhydride, succinic anhydride and itaconic anhydride, as well as reactive lactones, preferably propiolactone and a-angelicalactone. In the case of carboxylic anhydrides, substitution also occurs at the C6 position of the AGU as well as at the C2 position.

N-isopropylidene compounds of general formula

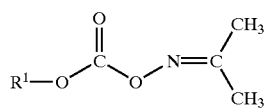

can also be used as esterification reagents, whereupon the corresponding carboxylic acid esters of the oligo- and polysaccharides are formed. $R^1$ is preferably an alkyl group comprising 2–18 C atoms, which can be saturated, unsaturated, straight-chain, branched or cyclic and which is optionally substituted, or can be an aryl group (which is optionally substituted). $R^1$ is most preferably selected from the group comprising acetyl, propyl, butyryl, vinyl, methacryl, cinnamoyl, pivaloyl and cyclohexyl.

Particularly suitable esterification reagents from the group comprising N-isopropylidene compounds include N-isopropylidene-O-methyl carbonate, N-isopropylidene-O-ethyl carbonate and N-isopropylidene-O-benzyl carbonate.

The method according to the invention is characterised in that the substrate is dissolved in a polar organic solvent—which is DMSO in the case of starch—to which the enzyme and the transesterification reagent are added, and is subsequently incubated. The incubation temperature is between 20° C. and 85° C., and is preferably within the range from 20 to 45° C., particularly in the interval from 35 to 45° C. The times of reaction range from 2 to 100 hours, whereupon a conversion of about 50% is achieved with respect to the acylating reagent. Alternatively, the transesterification reagent can be activated by the enzyme in a preceding step. After the reaction is complete, the enzyme is separated by liquid-solid separation (e.g. centrifugation, filtration). The product is isolated by precipitation and is washed and dried. The solvents which remain can be worked-up by distillation and can subsequently be recycled to the esterification process. The enzyme can thus be used in a cyclic process without loss of activity.

When the reaction in the aforementioned system is conducted at a temperature of 40° C., chemical esterification also occurs in addition to enzyme-catalysed esterification. This chemical esterification occurs with the production of degrees of substitution ranging from a few percent up to a maximum total degree of substitution corresponding to AS=0.25. This results in the esterification of other hydroxyl groups which are present in the molecule. This chemical esterification can be substantially suppressed if the reaction is conducted at lower temperatures (20–25° C.), or is preferably suppressed by conducting the reaction in systems which are almost anhydrous (water content<0.01%).

A partial degree of substitution of up to AS=1.0 at the C2 position of the AGU can be achieved in oligo- and polysaccharides by the method according to the invention. Any desired partial AS≦1.0 at the C2 position of the AGU can be achieved via the molar equivalents of acylating reagent which are used (Table 1).

TABLE 1

Molar equivalents of vinyl acetate and $AS_{acetate}$ values which can be achieved during the production of 2-O-acetylstarch with proteinase N in DMSO at 39° C. and at a time of reaction of 70 hours.

| Molar equivalents vinyl acetate | 0.5 | 1.0 | 1.5 | 2.3 | 4.0 |
|---|---|---|---|---|---|
| $AS_{acetate}$ | 0.3 | 0.5 | 0.7 | 1.0 | 1.1 |

The partial AS in the C2 position of the AGU can also be adjusted via the reaction kinetics as well as via the molar equivalents, i.e. desired AS values≦1.0 can be achieved depending on the time at which the reaction is stopped (Table 2).

TABLE 2

Time of reaction and $AS_{acetate}$ values which can be achieved during the production of 2-O-acetylstarch with proteinase N in DMSO at 39° C. and 2.3 molar equivalents of vinyl acetate.

| Time of reaction (hours) | 2 | 5 | 10 | 20 | 30 | 70 |
|---|---|---|---|---|---|---|
| $AS_{acetate}$ | 0.1 | 0.3 | 0.5 | 0.8 | 0.9 | 1.0 |

Verification of the regioselectivity of the enzymatically catalysed esterification reaction was effected on the intact oligo- or polysaccharide by one- and multi-dimensional NMR spectrometry. For this purpose, the remaining free hydroxyl groups were esterified with a suitable carboxylic anhydride, for example with propionic anhydride for saccharide acetates or with acetic anhydride for saccharide benzoates or for other saccharide acylates. These mixed esters are soluble in chloroform and can be investigated by NMR spectrometry. After evaluating the signals of the AGU protons as hydrocarbons via $^1H/^1H$ and $^1H/^{13}C$ correlation, the corresponding acyl groups can be assigned to their position on the AGU with the aid of a $^1H/^{13}C$ multiple bond correlation which is detected using $^1H$ (HMBC technique) (Carbohydr. Res. 224 (1992), 277–283).

In a variant of the method according to the invention, production is effected catalysed by salts only, without further addition of enzyme. Degrss of substitution<1.0 at the C2 position are thereby achieved.

As distinct from enzyme catalysis, regioselectivity here is controlled via the state of dissolution of the oligo- and polysaccharides in a polar organic solvent, preferably in DMSO. Interactions between the solvents and the AGU components increase the acidity of the proton of the hydroxyl group in the C2 position of the AGU (J. Am. Chem. Soc. 98 (1976), 4386). By employing a suitable salt as a catalyst, complete esterification of this position can then be effected, wherein it is possible either to employ reaction kinetics control or to control the reaction via the type and amount of catalyst (Table 3). The salt is usually present in a concentration of 1–10% by weight, preferably 2–5% by weight, with respect to the starting material.

TABLE 3

Dependence of the regioselectivity of acetylation of starch (Hylon VII) by vinyl acetate (2.3 molar equivalents) on the time of reaction and on the type and amount of catalyst

| Time of reaction (hours) | Catalyst Type | Amount (mol %)[1] | Starch acidity $AS_{total}$[2]* | $AS_{C2}$[3]** |
|---|---|---|---|---|
| 5 | $Na_2HPO_4$ | 10 | 0.52 | 0.52 |
| 5 | $Na_2HPO_4$ | 50 | 0.92 | 0.92 |
| 5 | $Na_2HPO_4$ | 100 | 0.95 | 0.95 |
| 70 | $Na_2HPO_4$ | 5 | 1.00 | 1.00 |
| 4 | $Na_2CO_3$ | 10 | 0.45 | 0.45 |
| 4 | $Na_2CO_3$ | 20 | 0.95 | 0.95 |
| 4 | $Na_2CO_3$ | 50 | 1.51 | 0.90. |
| 0.5 | $K_2CO_3$ | 10 | 0.70 | 0.70 |
| 1 | $K_2CO_3$ | 10 | 1.40 | 0.90 |

[1] with respect to the starch medium used.
[2] *$AS_{total}$ refers to total degree of substitution
[3] **$AS_{C2}$ refers to degree of substitution for the C2 position The method results in higher product yields, and the partial degree of substitution can be adjusted in a defined manner. Suitable solvents for carrying out the method include dimethylsulphoxide (DMSO), N,N-dimethylformamide (DMF) and N,N-dimethyl-acetamide (DMA).

The method can be applied to polysaccharides, preferably to starches with different amylose contents and molecular weights, to starch derivatives such as hydroxyethylstarch or hydroxypropylstarch, and to pullulan and pullulan derivatives and oligosaccharides such as cyclodextrin.

Suitable catalysts include salts of inorganic mineral acids, salts of carboxylic acids and carbonates of the alkali and alkaline earth metals. The preferred salts are $Na_2HPO_4$, $CaHPO_4$, $Na_2CO_3$, $MgCO_3(NH_4Cl)_2CO_3$, $Na_2SO_2$, $NH_4Cl$, NaBr, NaCl and LiCl, as well as sodium citrate. In order to suppress esterification at other hydroxyl groups, e.g. in the $C_3$ or $C_6$ position, when using salts of weak acids as catalysts, a maximum of only 10 mol % must be used with respect to the weight of oligo- or polysaccharide to be reacted, and at the same time a defined time of reaction must be adhered to.

Esters of general formula

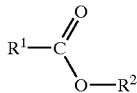

are preferably used as esterification reagents, wherein $R^2$ can denote vinyl, trihalogenoethyl or alkyl for example. Examples of $R^1$ include an alkyl group comprising 2–18 C atoms, which can be saturated, unsaturated, straight-chain, branched or cyclic (and which is optionally substituted), or an aryl group (which is optionally substituted). When esters of alkenoic acids are used, the double bonds can also be utilised for polymerisation in order to build up network structures. This option also exists when using esters of dicarboxylic acids comprising the $R^2$ radical, such as vinyl adipate, wherein crosslinking can be effected uniformly in the special polysaccharide.

Other esterification reagents include carboxylic anhydrides, for example acetic anhydride, propionic anhydride, succinic anhydride and itaconic anhydride, as well as reactive lactones, preferably propiolactone and α-angelicalactone. In the case of carboxylic anhydrides, substitution also occurs at the C6 position of the AGU as well as at the C2 position.

N-isopropylidene compounds of general formula

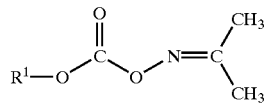

can also be used as esterification reagents, wherein the corresponding carboxylic acid esters of the oligo- and polysaccharides are formed. Examples of $R^1$ include alkyl groups comprising 2–18 C atoms, which can be saturated, unsaturated, straight-chain, branched or cyclic (and which are optionally substituted), and aryl groups (which are optionally substituted).

The method according to the invention is characterised in that oligo- or polysaccharides are regioselectively esterified at the hydroxyl group of position C2 of the anhydroglucose unit by active esters in polar organic solvents—preferably DMSO—using salts as catalysts. The reaction temperature is between 20° C. and 100° C., and is preferably within the range from 30 to 50° C. The times of reaction range from 0.5 to 100 hours, depending on the reaction temperature and on the catalyst used. The catalyst is separated by liquid-solid separation (e.g. centrifugation, filtration). Alternatively, a defined amount of water can also be added to the precipitant, in order to dissolve out the catalyst. The resulting ester is isolated by precipitation and is washed and dried.

The solvents which remain can be worked-up by distillation and can subsequently be recycled to the esterification process.

With the method according to the invention, a partial degree of substitution at the C2 position of the AGU of up to AS=1.0 can be achieved according to choice via the reaction kinetics or via the molar equivalents of transesterification reagent used.

Regioselectivity was verified by means of two-dimensional NMR spectrometry. For this purpose, the acylated polysaccharide had to be completely propionylated in the case of acetates, or acetylated in the case of other polysaccharide esters. In this manner, the substitution site can be unambiguously verified by means of multiple bond correlation (Carbohydr. Res. 224 (1992), 277–283).

The products which are obtained by the method according to the invention, e.g. starch acetates, can be decomposed by amylases. At a suitable molecular weight of the starch and when substitution is effected strictly at the C2 position, starch acetates are suitable as blood plasma expanders. 2-O-acetylstarch is particularly suitable for this application. Therefore, the present invention further relates to the use of 2-O-acetylstarch as a blood plasma expander. Moreover, biodegradable plastics can be synthesised from starch acylates. Membranes having a substantially uniform structure can be synthesised by crosslinking processes. Absorbents for different applications can also be produced by treatment to form further derivatives. Starch acetates which have thermoplastic properties can conceivably be used in the pharmaceutical industry as active ingredient retardants.

Regioselectively substituted cyclodextrin esters can be used in the pharmaceutical industry as carriers for pharmaceutical active ingredients. Furthermore, compounds of high molecular weight can be synthesised, in the manner of copolymers, which could be suitable for chromatography (e.g. for the separation of enantiomers).

EXAMPLES

Example 1

40 g starch (Hylon VII, a native maize starch with a high amylose content manufactured by National Starch &

Chemical) were heated in 2 liters DMSO to 80° C. until a clear solution was formed. After cooling, 54 ml vinyl acetate and 750 mg proteinase N of *Bacillus subtilis* were added (the protease was activated by dissolving it in a phosphate buffer pH=7.8; c=0.15 M) and subsequent lyophilisation; the actual amount of enzyme weighed in was therefore 1.5 g). The mixture was shaken for 70 hours at 39° C. After removing the enzyme by centrifugation, the clear centrifugate was precipitated. The 2-O-acetylstarch was filtered off under suction, washed, and finally dried under vacuum.

46 g 2-O-acetylstarch were obtained which had an AS=1.0.

Example 2

40 g starch (Hylon VII) were heated in 2 liters DMSO to 80° C. until a clear solution was formed. 54 ml vinyl acetate and 750 mg proteinase N of *Bacillus subtilis* were added (see Example 1 for the activation of the protease). The mixture was shaken for 20 hours at 80° C. After removing the enzyme by centrifugation, the clear centrifugate was precipitated. The 2-O-acetylstarch was filtered off under suction, washed, and finally dried under vacuum.

46 g 2-O-acetylstarch were obtained which had an AS=1.0.

Example 3

2 g b-cyclodextrin (manufactured by Fluka) were dissolved in 20 ml DMSO, and 2.7 ml vinyl acetate and 37 mg proteinase N of *Bacillus subtilis* were subsequently added (see Example 1 for the activation of the protease). The mixture was shaken for 70 hours at 39° C. After removing the enzyme by centrifugation, the clear centrifugate was concentrated, and the product was precipitated, washed, and finally dried under vacuum. 2.1 g heptakis-2-O-acetyl-b-cyclodextrin were obtained.

Example 4

2 g b-cyclodextrin were dissolved in 20 ml DMSO, and 2.7 ml vinyl acetate and 37 mg proteinase N of *Bacillus subtilis* were subsequently added (see Example 1 for the activation of the protease). The mixture was shaken for 70 hours at 39° C. After removing the enzyme by centrifugation, the clear centrifugate was concentrated, and the product was precipitated, washed, and finally dried under vacuum. 2.1 g heptakis-2-O-acetyl-b-cyclodextrin were obtained.

Example 5

2 g starch (Hylon VII) were heated in 40 ml DMSO to 80° C. until a clear solution was formed. After cooling, 12.5 g 2,2,2-trichloroethyl acetate and 37 mg proteinase N of *Bacillus subtilis* were added (see Example 1 for the activation of the protease). The mixture was shaken for 70 hours at 39° C. After removing the enzyme by centrifugation, the clear centrifugate was precipitated. The 2-O-acetylstarch was filtered off under suction, washed, and finally dried under vacuum.

2.0 g 2-O-acetylstarch were obtained which had an AS=0.4.

Example 6

2 g starch (Hylon VII) were heated in 40 ml DMSO to 80° C. until a clear solution was formed. After cooling, 1.9 g N-isopropylidene-O-methyl carbonate and 37 mg proteinase N of *Bacillus subtilis* were added (see Example 1 for the activation of the protease). The mixture was shaken for 70 hours at 39° C. After removing the enzyme by centrifugation, the clear centrifugate was precipitated. The starch derivative was filtered off under suction, washed, and finally dried under vacuum.

2.0 g 2-O-methoxycarbonylstarch were obtained which had an AS 0.4.

Example 7

2 g starch (Hylon VII) were heated in 40 ml DMSO to 80° C. until a clear solution was formed. After cooling, 2.7 ml vinyl acetate and 37 mg thermolysin were added (see Example 1 for the activation of the protease). The mixture was shaken for 70 hours at 39° C. After removing the enzyme by centrifugation, the clear centrifugate was precipitated. The acetylstarch was filtered off under suction, washed, and finally dried under vacuum.

2.4 g 2,6-O-diacetylstarch were obtained which had an AS=1.0 at the C2 position and an AS=0.4 at the C6 position.

Example 8

2 g starch (Hylon VII) were heated in 40 ml DMSO to 80° C. until a clear solution was formed. After cooling, 2.7 ml acetic anhydride and 37 mg proteinase N of *Bacillus subtilis* were added (see Example 1 for the activation of the protease). The mixture was shaken for 70 hours at 39° C. After removing the enzyme by centrifugation, the clear centrifugate was precipitated. The acetylstarch was filtered off under suction, washed, and finally dried under vacuum.

2.0 g acetylstarch were obtained which had an AS=0.7 at the C2 and C6 positions of the AGU.

Example 9

0.3 g of enzymatically produced starch acetate (Example 1) was suspended in 5 ml pyridine. 0.1 g dimethylaminopyridine (DMAP) and 5 ml propionic anhydride were added to this suspension, which was stirred for 20 hours at 90° C. The propionylated starch acetate was precipitated in ethanol, intensively washed with ethanol and dried under vacuum. A completely substituted 2-O-acetyl-3,6-O-dipropionylstarch was obtained.

The dried product exhibited no OH valency vibrations in the 3200–3600 $cm^{-1}$ IR range and was soluble in chloroform, which resulted in the following NMR data:

AGU: d=5.22(H1), 4.72(H2), 5.36(H3), 3.91–3.95(H4,H5), 4.53(H6), 4.24(H6')
propionyl at position 6: d=1.18($CH_3$), 2.45($CH_2$)
propionyl at position 3: d=1.05($CH_3$), 2.20($CH_2$)
acetyl at position 2: d=1.98($CH_3$)
(Bruker DRX 400 NMR spectrometer, 323 K)

Example 10

2 g cellulose, dissolved in N-methyl-morpholine-N-oxide (NMMNO), were diluted with DMSO (ratio by volume: VDMSO:VNMMO=1:1). 2.7 ml vinyl acetate and 37 mg proteinase N of *Bacillus subtilis* (see Example 1 for the activation of the protease) were subsequently added to the cellulose solution. This mixture was shaken at a temperature of T=80° C. for a period of 24 hours. After precipitating the product in hot water, it was repeatedly washed with water and finally dried under vacuum. 1.2 g acetyl cellulose were obtained which had an AS of 0.3.

Example 11

106 g starch (Hylon VII, a native maize starch with a high amylose content, manufactured by National Starch &

Chemical) were dissolved in 1 liter DMSO at 80° C. After cooling to 40° C., 140 ml vinyl acetate and 5 g $Na_2HPO_4$ were slowly added. The mixture was stirred for 70 hours and the insoluble $Na_2HPO_4$ was removed by centrifugation. The product was precipitated in ethanol, filtered under suction, washed and dried under vacuum. 116 g 2-O-acetylstarch was obtained which had an AS=1.0.

Example 12

106 g starch (Hylon VII, a native maize starch with a high amylose content, manufactured by National Starch & Chemical) were dissolved in 1 liter DMSO at 80° C. After cooling to 40° C., 63 ml vinyl acetate and 5 g $Na_2HPO_4$ were slowly added. The mixture was stirred for 70 hours and the insoluble $Na_2HPO_4$ was removed by centrifugation. The product was precipitated in ethanol, filtered under suction, washed and dried under vacuum.

102 g 2-O-acetylstarch was obtained which had an AS=0.7.

Example 13

2 g β-cyclodextrin (manufactured by Fluka) were dissolved in 20 ml DMSO, and 2.7 ml vinyl acetate and 20 mg $Na_2HPO_4$ were subsequently added. The mixture was stirred for 70 hours at 40° C. After removing the inorganic salt by centrifugation, the centrifugate was concentrated and the product was precipitated in ethanol, washed and dried under vacuum. 2.1 g heptakis-2-O-acetylstarch were obtained.

Example 14

2 g dextrin 20 (manufactured by Fluka) were dissolved in 40 ml DMSO at 80° C., and 2.7 ml vinyl acetate and 20 mg $Na_2HPO_4$ were subsequently added. The mixture was stirred for 70 hours at 40° C. After removing the inorganic salt by centrifugation, the centrifugate was concentrated and the product was precipitated in ethanol, washed and dried under vacuum. 2 g 2-O-acetyldextrin were obtained, which had an AS=1.0.

Example 15

2 g starch (Hylon VII, a native maize starch with a high amylose content, manufactured by National Starch & Chemical) were dissolved in 40 ml DMSO at 80° C. After cooling to 40° C., 2.7 ml vinyl acetate and 20 mg NaCl were slowly added. The mixture was stirred for 70 hours and the insoluble NaCl was removed by centrifugation. The product was precipitated in ethanol, filtered under suction, washed and dried under vacuum. 2.1 g 2-O-acetylstarch was obtained which had an AS=1.0.

Example 16

2 g starch (Hylon VII, a native maize starch with a high amylose content, manufactured by National Starch & Chemical) were dissolved in 40 ml DMSO at 80° C. After cooling to 40° C., 2.7 ml vinyl acetate and 20 mg $Na_2CO_3$ were slowly added. The mixture was stirred for 70 hours and the insoluble $Na_2CO_3$ was removed by centrifugation. The product was precipitated in ethanol, filtered under suction, washed and dried under vacuum. 2.1 g 2-O-acetylstarch was obtained which had an AS=1.0.

What is claimed is:

1. A method of producing a regioselectively substituted saccharide ester comprising,
    reacting, in the presence of an enzyme catalyst, a specie selected from the group consisting of oligo-saccharide and polysaccharide with an esterification reagent, said specie being one of dissolved or highly swollen.
wherein said regioselectively substituted saccharide ester is selected from the group consisting of oligo-saccharide ester and polysaccharide ester, having a partial average degree of substitution (AS) at the C2 position of its anhydroglucose unit of at least 90% relative to the total AS.

2. The method of claim 1 wherein said specie is at least one member selected from the group consisting of natural starch, starch derivative, ester of starch cellulose, cellulose derivative, and pullulan wherein the cellulose derivative is selected from the group consisting of cellulose esters and cellulose ethers, wherein said esters of starch and starch derivative are selected from the group consisting of 2-O-propionylstarch, 2-O-butyrlstarch, 2-O-benzoylstarch, 2-O-laurylstarch, 2-O-methoxycarbonylstarch, 2-O-acrylolystrarch, 2-O-methacrylolystarch and 2-O-acetylstarch.

3. The method of claim 1 wherein said enzyme catalyst is a protease.

4. The method of claim 3 wherein said protease is selected from the group consisting of proteinase N, subtilisin, protease 2A, protease 6, a-chymotrypsin, renin, papain, thermolysin and esterase.

5. The method of claim 1 wherein said reaction is conducted in a least one organic solvent selected from the group consisting of dimethylsulphoxide (DMSL), N,N-dimethylformamide (DMF), N,N-dimethylacetamide (DMA), pyridine and N-morpholine-N-oxide (NMMO).

6. The method of claim 1 further comprising the step of isolating said enzyme catalyst upon completion of said reaction.

7. The method of claim 1 wherein said esterification reagent is a vinyl ester.

8. The method of claim 7 wherein said vinyl ester is selected from the group consisting of vinyl acetate, vinyl propionate, vinyl laurate, vinyl butanoate, vinyl stearate vinyl benzoate, vinyl acrylate, vinyl methacrylate, vinyl crotonate, vinyl pivalate and divinyl adipate.

9. The method of claim 1 wherein said esterification reagent as a carboxylic anhydride.

10. The method of claim 9 wherein said carboxylic anhydride is at least one member selected from the group consisting of acetic anhydride, propionic anhydride, succinic anhydride and itaconic anhydride.

11. The method of claim 1 wherein said esterification reagent is at least one member selected from the group consisting of trihalogenoethyl esters and lactones.

12. The method of claim 11 wherein said esterification reagent is a lactone selected from the group consisting of propiolactone, butyrolactone and a-angelicalactone.

13. The method of claim 1 wherein said esterification reagent is at least one member selected from the group consisting of O-substituted-N-isopropylidene carbonates, N-isopropylidene-O-methyl carbonate, N-isopropylidene-O-ethyl carbonate and N-isopropylidene-O-benzyl carbonate.

* * * * *